United States Patent [19]

Arthur

[11] 4,203,193
[45] May 20, 1980

[54] METHOD OF ATTACHING A RAIL AND A TIE PLATE TO A CROSS TIE

[76] Inventor: David M. Arthur, 4020 N. 14th Ave., Phoenix, Ariz. 85013

[21] Appl. No.: 960,961

[22] Filed: Nov. 15, 1978

[51] Int. Cl.² .............................................. B23P 19/00
[52] U.S. Cl. ................................. 29/526 R; 85/21; 238/366; 238/371
[58] Field of Search ............ 29/526 R; 238/366, 371, 238/294, 295, 296; 85/21

[56] References Cited

U.S. PATENT DOCUMENTS

| | | | |
|---|---|---|---|
| 1,118,431 | 11/1914 | McKently | 85/21 X |
| 1,855,329 | 4/1932 | Wagner | 85/21 X |
| 2,719,452 | 10/1955 | Jones | 238/371 X |
| 3,367,576 | 2/1968 | Suermann | 238/366 |
| 3,927,467 | 12/1975 | Schoeman | 29/526 R |
| 3,964,680 | 6/1976 | Arthur | 238/371 X |

OTHER PUBLICATIONS

"The Arthur Railroad Spikelock", 1977.

Primary Examiner—Charlie T. Moon
Attorney, Agent, or Firm—Cahill, Sutton & Thomas

[57] ABSTRACT

A spike retainer which may be forcibly driven through an aperture in a tie plate into a wood cross tie includes an upper lip for engaging a flanged base of a rail supported by the tie plate. A movable wedge attached to the spike retainer is forced between the cross tie and the tie plate when a spike is forcibly inserted into the spike retainer, thereby clamping the tie plate and the flanged base of the rail between the upper lip and the movable wedge. The spike retainer is initially inserted into a pre-drilled hole in the cross tie by means of an insertion tool having a channel which permits the spike retainer to be forcibly inserted into the hole without engaging the movable wedge.

4 Claims, 11 Drawing Figures

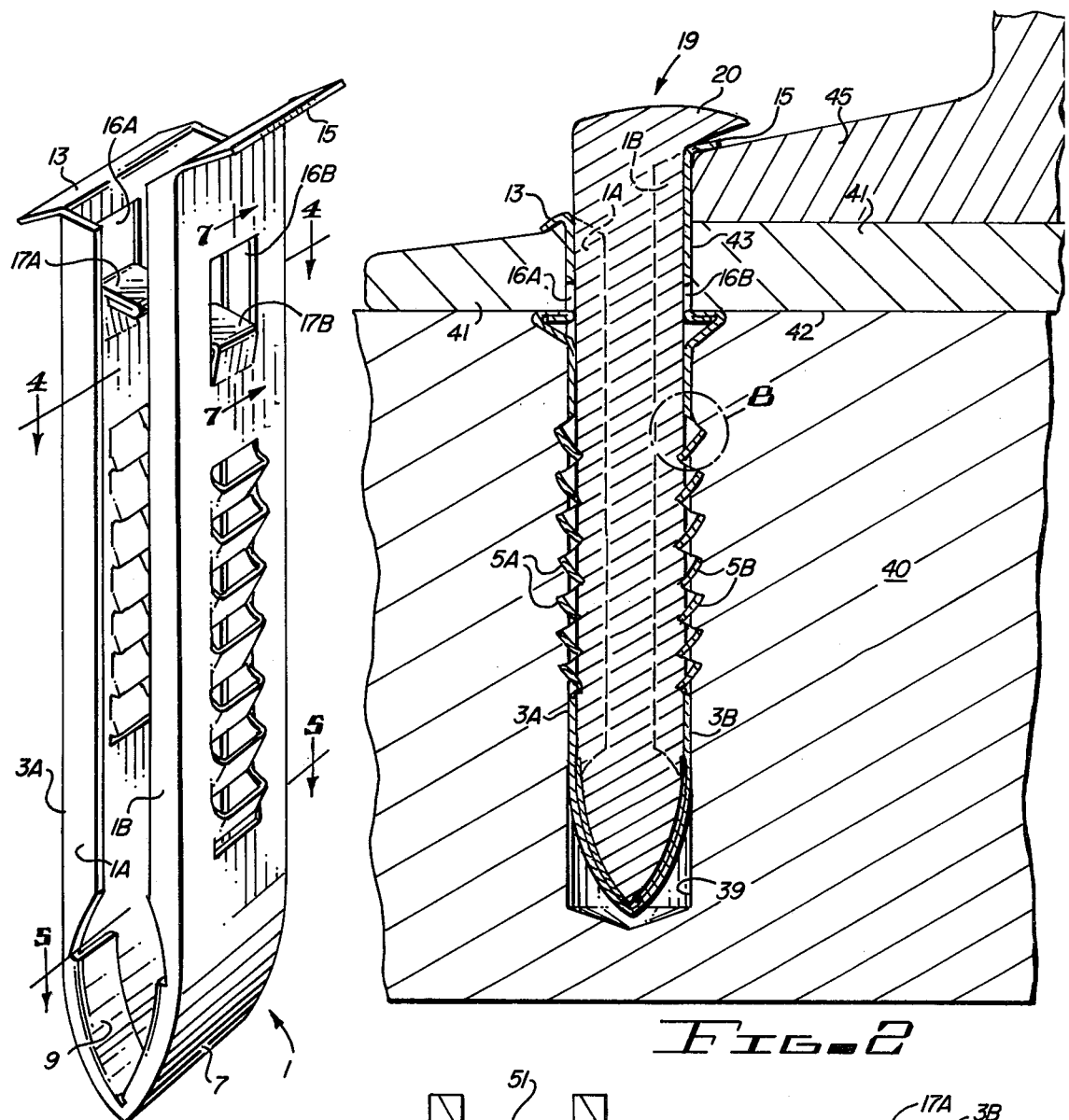
FIG-1
FIG-2
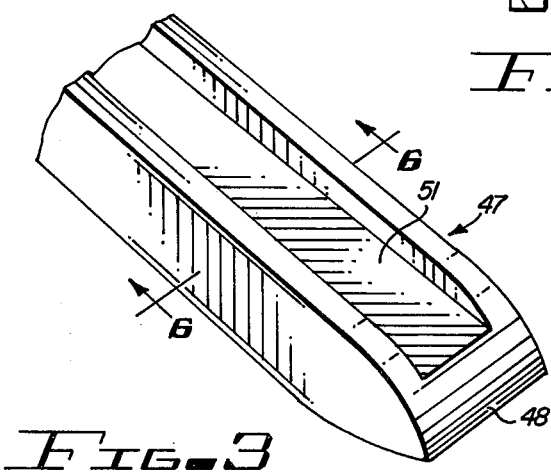
FIG-3
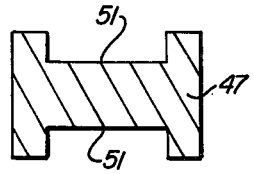
FIG-6
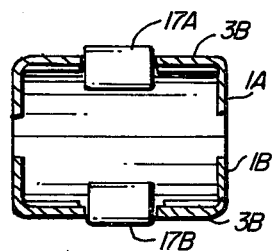
FIG-4
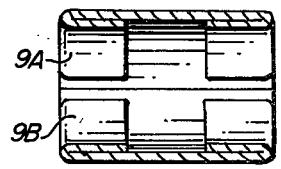
FIG-5

METHOD OF ATTACHING A RAIL AND A TIE PLATE TO A CROSS TIE

FIELD OF THE INVENTION

My invention relates to fastening of railroad rails to wood cross ties, and more particularly, to spike retainers which securely engage the rails with tie plates resting on the cross ties and supporting the rails.

BACKGROUND OF THE INVENTION

The railroad industry has long been plagued by the problem of loosening of rails from wood cross ties along the railway roadbeds. Although the rails are secured to the cross ties by driving headed spikes into the cross ties to contact the flanges of the rails, the spikes nevertheless may be loosened as a result of vertical forces caused by wave-like motions of the rails produced as engines and loaded cars move along the rails. Further, lateral wheel forces produced on the tops of the rails as a result of side-to-side swaying of the moving locomotive and its cars and centrifugal forces as the locomotive and cars traverse curves of the railway tend to cause rails to tilt or rock about their flanged bases. The wave-like motion and lateral forces due to swaying, and various early attempts to solve the problem are set forth in greater detail in my U.S. Pat. No. 3,964,680, filed Feb. 3, 1975, issued June 22, 1976, and incorporated herein by reference.

To alleviate the problem of loosening of spikes, various spike retainers have been utilized to reliably retain spikes in the wood cross ties despite the tendency of the above described forces to loosen spikes. The above mentioned patent discloses one such railroad spike retainer.

Railroad rails are ordinarily positioned on tie plates, which are thick rectangular steel plates having a width considerably greater than the width of the flanged base of the rails. Generally, grooves are provided in tie plates for snugly accommodating the flanged bases of the rails. Apertures are provided in the tie plates adjacent the flanged bases of the rails so that spikes can be driven through such apertures into the cross ties in such a manner that heads of the spikes securely engage the flanged bases. As long as the spikes remain tightly engaged in the cross ties, both the rails and the tie plates remain securely attached to the cross ties.

A railroad spike system referred to as the "PLATELOC" system, manufactured by True Temper Corp. of Cleveland, Ohio, provides a clamping device having a sharp lower lip which is forced into a wood cross tie immediately beneath the bottom surface of a tie plate. The clamping device also includes an upper lip which extends over the flanged base of a rail supported by the tie plate. The PLATELOC clamping device is inserted through an aperture in the tie plate immediately adjacent the flanged base of the rail. A specially designed spike is forcibly inserted through the aperture, forcing the clamping device against the tie plate and forcing the lower lip into the cross tie immediately below the bottom surface of the tie plate. The clamping device tends to clamp the flanged base and the tie plate together, thereby tending to prevent lateral tilting or rocking of the rail on the tie plate even if the spike becomes somewhat loosened (because the tie plate has a much broader base than the flanged base of the rail). However, the PLATELOC device is inconvenient to install, since a special operation is required to properly place the clamping device in the tie plate aperture before driving the spike through that aperture, and more importantly, it cannot be used with presently available spike retainers. This is a serious shortcoming, since presently available spike retainers have been proven to greatly increase the reliability with which spikes are retained in wooden cross ties. Yet another shortcoming of the PLATELOC system is that smaller spikes having only approximately half of the surface area of conventional spikes must be utilized, since tie plate apertures are of a standard size. Consequently, the capability of the PLATELOC spikes to grip the walls of the holes in wood cross ties is believed to be substantially reduced. The PLATELOC system therefore is believed to be unduly subject to loosening of spikes.

Accordingly, it is an object of the invention to provide a system for avoiding or reducing the tendency of railroad rails to tilt as a result of lateral wheel forces produced by locomotives and cars traversing a railway.

Another object of the invention is to provide an improved system for connecting rails to cross ties wherein spikes are reliably retained in wooden cross ties and wherein flanged bases of rails are securely clamped to underlying tie plates.

Another rail fastening device, known as a gauge LOCKSPIKE includes a spike shaped somewhat like a hairpin, wherein the end portions of the legs of the fastener are parallel, but are separated at their upper ends so that compression on the separated portions of the legs by the hole in the base plate creates a tendency for the ends of the legs to separate in a hole in the wooden cross tie, resulting in increased gripping of the wooden cross tie. However, the LOCKSPIKE device is not suitable for use with spike retainers, and does not provide rigid clamping between the base plate of a rail and the base plate. Therefore, gripping of the wooden cross tie tends to be reduced as the spike becomes loosened due to the above mentioned forces.

Yet another object of the invention is to provide a rail fastening system wherein clamping between a flanged base of a rail and a supporting tie plate is not substantially reduced as a result of loosening of a spike.

SUMMARY OF THE INVENTION

A rail holding spike is resiliently retained in a rail supporting cross tie by a U-shaped retainer having legs with louvers extending outward from both sides of each leg, the louvers being made of harder material than the spike. The plurality of louvers are horizontally positioned on each leg and are inclined with respect to the planes of the legs to bite into the spike and the cross tie to increase retaining forces on both the spike and the cross tie in response to any receding movement of the spike. The retainer further includes an upper lip which extends over and engages the flanged base of the rail. The rail is supported upon a tie plate disposed between the flanged base and the cross tie. The retainer is forcibly driven into the cross tie through a hole in the tie plate adjacent the flanged base of the rail. A movable wedge portion of the retainer includes a portion which extends into the path of the rail holding spike. When the rail holding spike is forcibly inserted into the retainer, the movable wedge is forced between the cross tie and the bottom surface of the tie plate. The tie plate and the flanged base of the rail thus are clamped between the movable wedge and the upper lip of the retainer. The retainer is initially driven into a pre-drilled hole in the cross tie by means of an insertion tool having a channel which allows the insertion tool to avoid moving of the movable wedge while the insertion tool is inserted into the retainer to forcibly drive the retainer into the pre-drilled hole.

BRIEF DESCRIPTION OF THE DRAWINGS

FIG. 1 is a perspective view of a tie plate clamping railroad spike retainer of the present invention.

FIG. 2 is a sectional view showing the retainer of FIG. 1 and a spike installed in a wood railroad cross tie to fasten a flanged base of a railroad rail and a tie plate to the cross tie.

FIG. 3 is a partial perspective view of an insertion tool utilized to insert the retainer of FIG. 1 into a pre-drilled hole in a wood cross-tie.

FIG. 4 is a sectional view taken along section lines 4—4 of FIG. 1.

FIG. 5 is a sectional view taken along section lines 5—5 of FIG. 1.

FIG. 6 is a sectional view taken along section lines 6—6 of FIG. 3.

DESCRIPTION OF THE INVENTION

Figure 7:
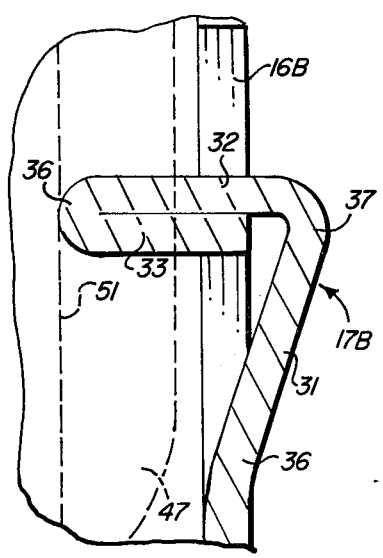
FIG. 7 is a partial sectional view showing the relationship of the insertion tool of FIG. 3 and the movable wedge of the retainer of FIG. 1 during a retainer insertion process.

Referring now to the drawings, particularly to FIG. 1, spike retainer or spike retention means 1 has two legs 3A and 3B which are connected by a lower pointed chisel end 7 to form a U-shaped structure. The legs of the U-shaped structure conform to the contour of a headed spike 19, as shown in the sectional view of FIG. 2. As subsequently explained, retainer 1 is forcibly inserted into a pre-drilled hole in a cross tie before spike 19 is forcibly inserted into retainer 1.

Leg 3A includes two opposed reinforcing flanges 11A; similarly, leg 3B includes two opposed reinforcing flanges 11B. A reinforcing liner 9 is disposed along the inner surface of chisel end 7 of retainer 1.

Figure 8:
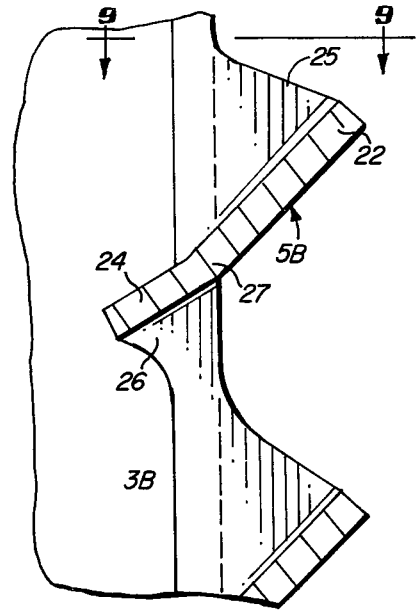
FIG. 8 is an enlarged view of detail 8 in FIG. 2.
Figure 9:
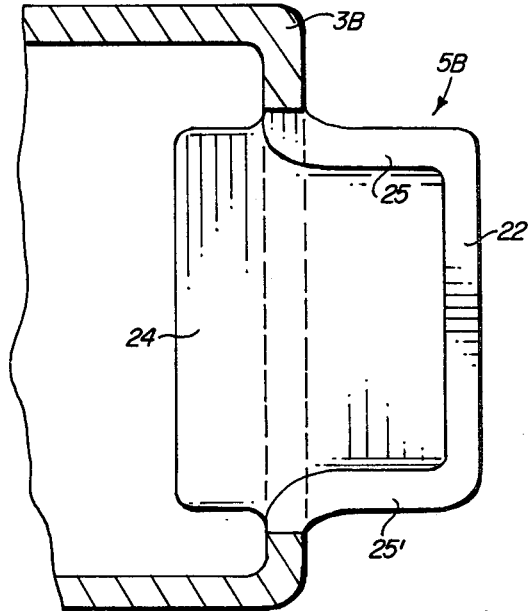
FIG. 9 is a sectional view taken along section lines 9—9 of FIG. 8.
Figure 10:
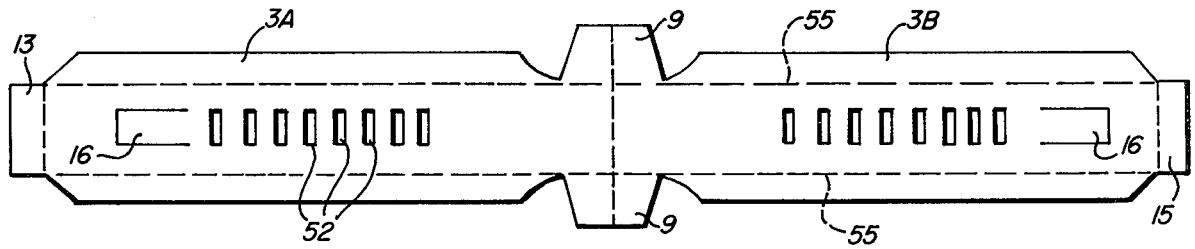
FIG. 10 is a plan view showing a pre-punched strip of metal from which the retainer of FIG. 1 can be stamped.

Legs 3A and 3B include a plurality of fixed louver-like plates 5A and 5B, respectively, hereinafter referred to as louvers. One of the louvers will be described in detail by referring to FIGS. 8 and 9, which show an expanded sectional and top view of louver 5B. Louver 5B includes an upper end 22 which extends upwardly and outwardly with respect to retainer 1. Louver 5B also includes a lower end 24 which extends downwardly and interiorly with respect to retainer 1. Each louver is formed by stamping the pre-punched metal strip of FIG. 10 to force its upper end 22 outward and its lower end 24 inward, the resulting louver being connected at each end by means of flanges 25 and 26 to the wall of the corresponding leg 3A or 3B. It can be seen that a separate louver is formed by the metal between each of the rectangular holes 52 in FIG. 10 as a result of the above stamping process.

Louver 5B includes a bend 27, whereby the angle between the wall of leg 3B and upper end 22 is different than the angle between leg 3B and lower end 24. In the described embodiment of the invention, the former angle may be approximately 45° while the second angle may be approximately 60°. The two angles are chosen to produce optimum movement-resisting engagement of upper end 22 and lower end 24 with wooden cross tie 40 and steel spike 19, respectively, to maximize resistance of retainer 1 to any forces tending to loosen spike 19.

It can be observed that end 22 of louver 5B extends outwardly a greater distance than end 24 from leg 3B. In the presently preferred embodiment of the invention, end 22 extends approximately 0.100 inches outward from the outer surface of leg 3B and end 24 extends approximately 0.070 inches inwardly from the inner surface of leg 3B. The reason that end 22 extends outwardly from leg 3B by a lesser distance than end 24 is to prevent downward motion of spike 19 (as it is being forcibly inserted into retainer 1) from bending end 24 beyond its elastic limit. Consequently, end 24 can resiliently spring back to its original angle after spike 19 has been completely inserted into retainer 1. End 24 then optimally digs into the surface of spike 19 to resist any receding or loosening of spike 19. Of course, the above mentioned angles and distances associated with the louvers are merely illustrative, and may be modified to perform optimum engagement of the louvers with various kinds of spike and cross tie materials.

Referring now to FIGS. 1 and 2, leg 3A of retainer 1 includes a lower lip or clamping means 13 extending outwardly from the plane of leg 3A. Leg 3B includes an upper lip or clamping means 15 extending outwardly from the plane of leg 3B. It can be readily seen that when retainer 1 is inserted into a pre-drilled hole 39 of cross tie 40 through a hole 43 in tie plate 41, lower lip 13 abuts or engages the upper surface of the tie plate 41, and upper lip 15 abuts the upper surface of the flanged base 45 of the rail, thereby holding flanged base 45 against tie plate 41.

Figure 7A:
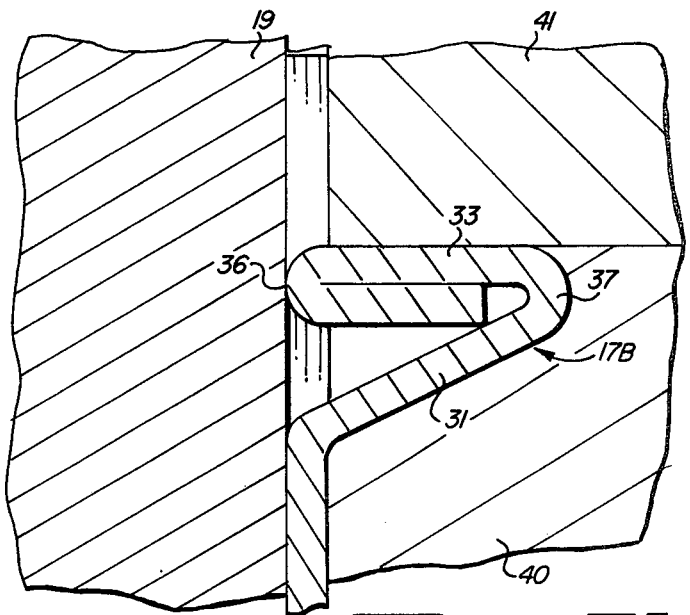
FIG. 7A illustrates the relationship between a spike, the movable wedge of the retainer, a tie plate, and a cross tie after installation of the retainer and spike.

Referring to FIGS. 1, 7, and 7A, retainer 1 includes movable wedges or wedge 17A and 17B in legs 3A and 3B, respectively. Movable wedges 17A and 17B are formed from pre-punched metal strip 1' of FIG. 10 by stamping tabs 16 in essentially the same manner as louvers 5A and 5B are formed. Prior to the forcible insertion of spike 19 into retainer 1, end 36 of movable wedge 17 extends interiorly into the volume subsequently occupied by spike 19, as is clearly shown in FIG. 7. Prior to insertion of spike 19, retainer 1 is forcibly inserted into pre-drilled hole 39 of cross tie 40 by means of insertion tool 47, which is partially shown in FIG. 3 and is indicated in dotted lines in FIG. 7.

Referring to FIG. 3, insertion tool 47 has two opposed channels 49 into which ends 36 of movable wedges 17A and 17B extend during forcible insertion of retainer 1 into pre-drilled hole 39. (A known specialized hydraulic machine (not shown) is connected to insertion tool 47 to force insertion tool 47 and retainer 1 into pre-drilled hole 39. The hydraulic machine then withdraws insertion tool 47. At this point spike 19 can be forcibly inserted into retainer 1). After retainer 1 is completely inserted, movable wedges 17A and 17B are in positions immediately adjacent the bottom surface 42 of tie plate 41. It is noted that chisel end 48 of insertion tool 47 is supported by reinforcing liner 9 to prevent damage to chisel end 7 of retainer 1.

Referring to FIGS. 7 and 7A, movable wedge 17B pivots about bend 30. Horizontal portion 32 of movable wedge 17B thus engages lower surface 42 of tie plate 40, so that flanged base 45 of the rail is effectively clamped between movable wedge 7B and upper lip 15. It should be noted that section 33, which is a portion of metal tab 16 (FIG. 10), punched out of leg 3B to form wedge 17B, is folded back against section 32 to provide increased rigidity of section 32.

As shown in FIG. 2, spike head 20 abuts upper lip 15 of retainer 1 when spike 19 is completely inserted into retainer 1. It can be readily seen that flanged base 45 and tie plate 41 are clamped together by the combined action of upper lip 15 and movable wedge 17B as spike 19 is driven into retainer 1. Lower lip 13 and movable wedge 17A further improve the engagement of retainer 1 to tie plate 41. Thus, the described spike retainer provides the advantage of clamping flanged base 45 of the railroad rail and tie plate 41 to prevent tilting of the rail and permits use of louvered spike retainers to enhance reliability of engagement of railroad spikes to wooden cross ties.

It should be apparent that those skilled in the art may make variations in the described embodiments of the invention within the true spirit and scope of the invention. For example, the angles and length of ends 22 and 24 of the louvers could be varied to suit varying requirements. Further, various other configurations of the movable wedge could be provided, such a providing bend 30 parallel, rather than vertical, to the axis of the spike retainer.

I claim:

1. A method of attaching a rail and a tie plate to a cross tie, the rail having a flanged base, the tie plate having an aperture therein, the cross tie having a hole therein, said method comprising the steps of:

a. aligning the aperture in the tie plate with the hole in the cross tie and the flanged base of the rail;
   b. inserting a spike retainer having a flange through the aperture of the tie plate and into the hole in the cross tie by means of a removable insertion tool until the flange engages the flanged base of the rail;
   c. removing the insertion tool from the spike retainer;
   d. inserting a spike having an enlarged head into the spike retainer;
   e. engaging the tie plate with the spike retainer to prevent substantial upward movement of the spike retainer with respect to the tie plate by means of a wedge-like element extending from the spike retainer;
   f. engaging the spike with the cross tie by
      i. deformably engaging the spike with the spike retainer to resiliently resist removal of the spike from the spike retainer; and
      ii. deformably engaging the spike retainer with the cross tie to resiliently resist removal of the spike retainer from the cross tie;
   g. inserting the spike into the spike retainer until the enlarged head of the spike engages the flange of the spike retainer to force the flange of the spike retainer against the flanged base of the rail, and clamp the tie plate and the flanged base of the rail together between the flange and the wedge-like element.

2. The method of claim 1 wherein said aligning includes the steps of placing the tie plate on the cross tie and placing the flanged base of the rail on the tie plate.

3. The method of claim 1 wherein step (e) includes inserting of said wedge-like element between the tie plate and the cross tie in response to said inserting of the spike.

4. The method of claim 3 wherein steps (e) and (f) are sequentially and substantially simultaneously performed.

* * * * *